(12) United States Patent
Du (10) Patent No.: US 12,438,774 B2
(45) Date of Patent: *Oct. 7, 2025

(54) MULTI-LAYERED POLICY MANAGEMENT

(71) Applicant: Palo Alto Networks, Inc., Santa Clara, CA (US)

(72) Inventor: Jun Du, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,799

(22) Filed: May 3, 2023

(65) Prior Publication Data

US 2023/0275928 A1 Aug. 31, 2023

Related U.S. Application Data

(63) Continuation of application No. 16/731,678, filed on Dec. 31, 2019, now Pat. No. 11,689,573.

(Continued)

(51) Int. Cl.
*H04L 9/40* (2022.01)
*G16Y 30/10* (2020.01)
*H04L 41/0631* (2022.01)
*H04L 41/0853* (2022.01)
*H04L 41/0894* (2022.01)
*H04L 41/22* (2022.01)
*H04L 67/12* (2022.01)

(52) U.S. Cl.
CPC ......... *H04L 41/0853* (2013.01); *G16Y 30/10* (2020.01); *H04L 41/0631* (2013.01); *H04L 41/0894* (2022.05); *H04L 41/22* (2013.01); *H04L 63/104* (2013.01); *H04L 63/105* (2013.01); *H04L 63/20* (2013.01); *H04L 67/12* (2013.01)

(58) Field of Classification Search
CPC ..... G16Y 30/10; H04L 41/0631; H04L 41/22; H04L 63/104; H04L 63/105; H04L 63/20
See application file for complete search history.

(56) References Cited

U.S. PATENT DOCUMENTS 6,142,682 A 11/2000 Skogby
6,877,146 B1 4/2005 Teig
(Continued)

FOREIGN PATENT DOCUMENTS

CA 2904463 10/2020
CN 101719899 6/2010
(Continued)

OTHER PUBLICATIONS

Al-Shaer et al., Design and Implementation of Firewall Policy Advisor Tools, 2002.
(Continued)

*Primary Examiner* — Gil H. Lee
(74) *Attorney, Agent, or Firm* — Van Pelt, Yi & James LLP (57) ABSTRACT

Techniques for enforcing policy on multiple levels are disclosed. A multi-level policy includes at least one policy at a low level of abstraction and at least one policy at a high level of abstraction. An Internet of Things (IoT) device is discovered on a network. The IoT device is classified. The set of multi-level policies is applied to the IoT device based on the classification of the IoT device.

20 Claims, 6 Drawing Sheets

Related U.S. Application Data (60) Provisional application No. 62/787,190, filed on Dec. 31, 2018.

(56) References Cited

U.S. PATENT DOCUMENTS

| | | |
|---|---|---|
| 8,146,133 B2 | 3/2012 | Moon |
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,863,276 B2 | 10/2014 | Giblin |
| 8,874,550 B1 | 10/2014 | Soubramanien |
| 8,891,528 B2 | 11/2014 | Moriarty |
| 8,898,788 B1 | 11/2014 | Aziz |
| 8,973,088 B1 | 3/2015 | Leung |
| 9,112,895 B1 | 8/2015 | Lin |
| 9,324,119 B2 | 4/2016 | Singh |
| 9,378,361 B1 | 6/2016 | Yen |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,614,742 B1 | 4/2017 | Zhang |
| 9,661,011 B1 | 5/2017 | Van Horenbeeck |
| 9,692,784 B1 | 6/2017 | Nenov |
| 9,774,604 B2 | 9/2017 | Zou |
| 9,800,603 B1 | 10/2017 | Sidagni |
| 9,807,110 B2 | 10/2017 | Harlacher |
| 9,824,356 B2 | 11/2017 | Kurian |
| 9,891,907 B2 | 2/2018 | Searle |
| 9,894,085 B1 | 2/2018 | Dmitriyev |
| 9,910,874 B1 | 3/2018 | Jamail |
| 9,961,096 B1 | 5/2018 | Pierce |
| 9,984,344 B2 | 5/2018 | Singh |
| 9,985,982 B1 | 5/2018 | Bartos |
| 10,038,700 B1 | 7/2018 | Duchin |
| 10,043,591 B1 | 8/2018 | Laborde |
| 10,122,747 B2 | 11/2018 | Mahaffey |
| 10,129,118 B1 | 11/2018 | Ghare |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1* | 6/2019 | Cam-Winget ...... G06F 21/6236 |
| 10,348,739 B2 | 7/2019 | Greenspan |
| 10,459,827 B1 | 10/2019 | Aghdaie |
| 10,489,361 B2 | 11/2019 | Sisk |
| 10,489,714 B2 | 11/2019 | Lee |
| 10,511,620 B2 | 12/2019 | Schwartz |
| 10,623,389 B2 | 4/2020 | Childress |
| 10,630,728 B2 | 4/2020 | Ghosh |
| 10,764,315 B1 | 9/2020 | Carroll |
| 10,862,911 B2 | 12/2020 | Dezent |
| 10,885,393 B1 | 1/2021 | Sirianni |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,115,823 B1 | 9/2021 | Heiland |
| 11,310,247 B2 | 4/2022 | Manadhata |
| 11,455,641 B1 | 9/2022 | Shahidzadeh |
| 11,477,202 B2 | 10/2022 | De Knijf |
| 2004/0243835 A1 | 12/2004 | Terzis |
| 2005/0044406 A1 | 2/2005 | Stute |
| 2005/0281291 A1 | 12/2005 | Stolfo |
| 2006/0095970 A1 | 5/2006 | Rajagopal |
| 2006/0265397 A1 | 11/2006 | Bryan |
| 2007/0094725 A1 | 4/2007 | Borders |
| 2008/0059536 A1* | 3/2008 | Brock ...................... H04L 63/20 |
| 2009/0180391 A1 | 7/2009 | Petersen |
| 2010/0054278 A1 | 3/2010 | Stolfo |
| 2010/0284282 A1 | 11/2010 | Golic |
| 2011/0022812 A1 | 1/2011 | Van Der Linden |
| 2011/0087626 A1 | 4/2011 | Yeleshwarapu |
| 2011/0231510 A1 | 9/2011 | Korsunsky |
| 2011/0239267 A1 | 9/2011 | Lyne |
| 2012/0065749 A1 | 3/2012 | Hunter |
| 2012/0102543 A1 | 4/2012 | Kohli |
| 2012/0174221 A1 | 7/2012 | Han |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1 | 9/2013 | Spurlock |
| 2013/0305357 A1 | 11/2013 | Ayyagari |
| 2013/0305358 A1 | 11/2013 | Gathala |
| 2014/0006479 A1 | 1/2014 | Maloo |
| 2014/0157405 A1 | 6/2014 | Joll |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0161024 A1 | 6/2015 | Gupta |
| 2015/0172303 A1 | 6/2015 | Humble |
| 2015/0199610 A1 | 7/2015 | Hershberg |
| 2015/0229654 A1 | 8/2015 | Perier |
| 2015/0256431 A1 | 9/2015 | Buchanan |
| 2015/0262067 A1 | 9/2015 | Sridhara |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2015/0324559 A1 | 11/2015 | Boss |
| 2015/0356451 A1 | 12/2015 | Gupta |
| 2016/0006815 A1 | 1/2016 | Dong |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0164721 A1 | 6/2016 | Zhang |
| 2016/0173446 A1 | 6/2016 | Nantel |
| 2016/0173495 A1 | 6/2016 | Joo |
| 2016/0182497 A1 | 6/2016 | Smith |
| 2016/0196558 A1 | 7/2016 | Mercille |
| 2016/0210556 A1 | 7/2016 | Ben Simhon |
| 2016/0212099 A1 | 7/2016 | Zou |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1* | 12/2016 | Park ................... H04L 63/1458 |
| 2016/0366141 A1 | 12/2016 | Smith |
| 2016/0366181 A1 | 12/2016 | Smith |
| 2016/0381030 A1 | 12/2016 | Chillappa |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0063889 A1 | 3/2017 | Muddu |
| 2017/0063905 A1 | 3/2017 | Muddu |
| 2017/0085580 A1 | 3/2017 | Thanos |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0214701 A1 | 7/2017 | Hasan |
| 2017/0230402 A1 | 8/2017 | Greenspan |

(56) References Cited

U.S. PATENT DOCUMENTS

| | | |
|---|---|---|
| 2017/0232300 A1 | 8/2017 | Tran |
| 2017/0235585 A1 | 8/2017 | Gupta |
| 2017/0235783 A1* | 8/2017 | Chen ................ H04L 41/0894 707/691 |
| 2017/0242414 A1 | 8/2017 | Coote |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289168 A1 | 10/2017 | Bar |
| 2017/0289184 A1 | 10/2017 | C |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007055 A1 | 1/2018 | Infante-Lopez |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0027020 A1 | 1/2018 | Pallas |
| 2018/0039555 A1 | 2/2018 | Salunke |
| 2018/0054449 A1 | 2/2018 | Nandha Premnath |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0124096 A1 | 5/2018 | Schwartz |
| 2018/0139227 A1 | 5/2018 | Martin |
| 2018/0144139 A1 | 5/2018 | Cheng |
| 2018/0173881 A1 | 6/2018 | Oberheide |
| 2018/0191729 A1* | 7/2018 | Whittle ................ H04L 67/303 |
| 2018/0191746 A1 | 7/2018 | De Knijf |
| 2018/0191755 A1 | 7/2018 | Monaco |
| 2018/0191848 A1 | 7/2018 | Bhattacharya |
| 2018/0205793 A1 | 7/2018 | Loeb |
| 2018/0212768 A1* | 7/2018 | Kawashima ........ H04L 63/0876 |
| 2018/0234302 A1 | 8/2018 | James |
| 2018/0234519 A1 | 8/2018 | Boyapalle |
| 2018/0248902 A1 | 8/2018 | Dănilă-Dumitrescu |
| 2018/0255084 A1 | 9/2018 | Kotinas |
| 2018/0261070 A1 | 9/2018 | Stevens |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0302440 A1 | 10/2018 | Hu |
| 2018/0349598 A1 | 12/2018 | Harel |
| 2018/0349612 A1 | 12/2018 | Harel |
| 2018/0351972 A1 | 12/2018 | Yu |
| 2018/0357556 A1 | 12/2018 | Rai |
| 2018/0375887 A1 | 12/2018 | Dezent |
| 2019/0019249 A1 | 1/2019 | Bhattacharjee |
| 2019/0037041 A1 | 1/2019 | Ikeuchi |
| 2019/0081961 A1 | 3/2019 | Bansal |
| 2019/0089747 A1 | 3/2019 | Wang |
| 2019/0098028 A1* | 3/2019 | Ektare ................ H04L 41/0893 |
| 2019/0098058 A1* | 3/2019 | Ikegami ................ H04L 63/205 |
| 2019/0109717 A1 | 4/2019 | Reddy |
| 2019/0121978 A1 | 4/2019 | Kraemer |
| 2019/0138512 A1 | 5/2019 | Pourmohammad |
| 2019/0140906 A1 | 5/2019 | Furuichi |
| 2019/0166016 A1 | 5/2019 | Livanos |
| 2019/0182278 A1 | 6/2019 | Das |
| 2019/0253319 A1 | 8/2019 | Kampanakis et al. |
| 2019/0268267 A1 | 8/2019 | Pignataro |
| 2019/0268305 A1 | 8/2019 | Xu |
| 2019/0296979 A1* | 9/2019 | Gupta .................... G06N 20/00 |
| 2019/0349426 A1 | 11/2019 | Smith |
| 2019/0361917 A1 | 11/2019 | Tran |
| 2019/0373007 A1 | 12/2019 | Salunke |
| 2019/0373472 A1 | 12/2019 | Smith |
| 2019/0387399 A1 | 12/2019 | Weinberg |
| 2020/0036603 A1* | 1/2020 | Nieves .................... H04L 47/83 |
| 2020/0074085 A1 | 3/2020 | Cheng |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0162425 A1 | 5/2020 | Vasseur |
| 2020/0162503 A1 | 5/2020 | Shurtleff |
| 2020/0177485 A1 | 6/2020 | Shurtleff |
| 2020/0177589 A1* | 6/2020 | Mangalvedkar ........ H04W 4/50 |
| 2020/0195679 A1 | 6/2020 | Du |
| 2020/0211721 A1 | 7/2020 | Ochoa |
| 2020/0213146 A1 | 7/2020 | Kodam |
| 2020/0285457 A1 | 9/2020 | Meriac |
| 2020/0285997 A1 | 9/2020 | Bhattacharyya |
| 2020/0366717 A1 | 11/2020 | Chaubey |
| 2020/0409957 A1 | 12/2020 | Zhang |
| 2021/0058430 A1 | 2/2021 | Novak |
| 2021/0203615 A1 | 7/2021 | Roy |
| 2021/0360406 A1 | 11/2021 | Heiland |
| 2022/0060491 A1 | 2/2022 | Achleitner |
| 2022/0086071 A1 | 3/2022 | Sivaraman |
| 2022/0138634 A1 | 5/2022 | Covell |
| 2022/0159020 A1 | 5/2022 | Wang |
| 2022/0210065 A1 | 6/2022 | Khanna |
| 2022/0210066 A1 | 6/2022 | Khanna |
| 2023/0049886 A1 | 2/2023 | Sesha |

FOREIGN PATENT DOCUMENTS

| | | |
|---|---|---|
| CN | 102025577 | 7/2012 |
| CN | 102291430 | 11/2013 |
| CN | 107862468 | 3/2018 |
| CN | 104837158 | 5/2018 |
| CN | 108650133 | 10/2018 |
| CN | 105659633 | 4/2020 |
| CN | 107135093 | 5/2020 |
| CN | 108306911 | 12/2020 |
| EP | 3136297 | 3/2017 |
| EP | 3576373 | 12/2019 |
| JP | 2016532957 | 10/2016 |
| JP | 2018513467 | 5/2018 |
| JP | 2019536144 | 12/2019 |
| JP | 2020503784 | 1/2020 |
| KR | 20170059546 | 5/2017 |
| WO | 2019218874 | 11/2019 |

OTHER PUBLICATIONS

Al-Shaer et al., Firewall Policy Advisor for Anomaly Discovery and Rule Editing, Integrated Network Management VIII, 2003.
Arash Fasihi, Rule Based Inference and Action Selection Based on Monitoring Data in IoT, Dec. 1, 2015.
Author Unknown, Cisco Encrypted Traffic Analytics, Feb. 10, 2021.
Blackstock et al., IoT Interoperability: A Hub-based Approach, 2014, IEEE International Conference on the Internet of Things (IOT), pp. 80-84.
Charu C. Aggarwal, Outlier Analysis, Feb. 10, 2013, Retrieved from the Internet, URL:https://web.archive.org/web/20130210212057/http://charuaggarwal.net/outlierbook.pdf.
Charyyev et al., Locality-Sensitive IoT Network Traffic Fingerprinting for Device Identification, IEEE Internet of Things Journal, 2020, vol. 8, No. 3, pp. 1272-1281.
Chen et al., A Model-Based Validated Autonomic Approach to Self-Protect Computing Systems, IEEE Internet of Things Journal, Oct. 2014, pp. 446-460, vol. 1, No. 5.
Cramer et al., Detecting Anomalies in Device Event Data in the IoT, Proceedings of the 3td International Conference on Internet of Things, Big Data and Security, Mar. 21, 2018, pp. 52-62.
Du et al., A Lightweight Flow Feature-Based IoT Device Identification Scheme, Security and Communication Networks, 2022.
Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

(56) References Cited

OTHER PUBLICATIONS

Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.
International Application No. PCT/US2016/025661, International Search Report and Written Opinion mailed Jul. 7, 2016.
Li et al., A Distributed Consensus Algorithm for Decision Making in Service-Oriented Internet of Things, Old Dominion University, ODU Digital Commons, 2014.
Liu et al., A Lightweight Anomaly Mining Algorithm in the Internet of Things, 2014 IEEE 5th International Conference on Software Engineering and Service Science, 2014, pp. 1142-1145.
Martin et al., Requirements and Recommendations for CWE Compatibility and CWE Effectiveness, Version 1.0, Jul. 28, 2011.
Midi et al., Kalis—A System for Knowledge-driven Adaptable Intrusion Detection for the Internet of Things, 2017 IEEE 37th International Conference on Distributed Computing Systems, pp. 656-666.
Miloslavskaya et al., Ensuring Information Security for Internet of Things, 2017, IEEE 5th International Conference of Future Internet of Things and Cloud, pp. 62-69.
National Electrical Manufacturers Association, Manufacturer Disclosure Statement for Medical Device Security, HIMSS/NEMA Standard HN Jan. 2013, 2013.
Nguyen et al., A Software-Defined Model for IoT Clusters: Enabling Applications on Demand, Faculty of Engineering and IT, University of Technology Sydney, Australia, IEEE Xplore, Apr. 23, 2018.
Sivanathan et al., Classifying IoT Devices in Smart Environments Using Network Traffic Characteristics, IEEE, TMC, No. 8, pp. 1745-1759, Aug. 2018.
Sivanathan et al., Detecting Behavioral Change of IoT Devices Using Clustering-Based Network Traffic Modeling, IEEE LCN 2019, Mar. 30, 2020.
Sivanathan et al., Inferring IoT Device Types from Network Behavior Using Unsupervised Clustering, IEEE ICN 2019, Oct. 2019.
Zhao et al., A Few-Shot Learning Based Approach to IoT Traffic Classification, IEEE Communications Letters, 2021.
Meidan et al., ProfiIoT: A Machine Learning Approach for IoT Device Identification Based on Network Traffic Analysis, In Proceedings of the Symposium on Applied Computing (SAC'17), Apr. 3-7, 2017, pp. 506-509.
Fahim et al., Anomaly detection, analysis and prediction techniques in IoT environment: A systematic literature review, IEEE Access, vol. 7, 2019, pp. 81664-81681.
Nassif et al., Machine learning for anomaly detection: A systematic review, IEEE Access, vol. 9, 2021, pp. 78658-78700.
Liu et al., Noise removal in the presence of significant anomalies for industrial IoT sensor data in manufacturing, IEEE Internet of Things Journal, vol. 7, No. 8, Aug. 2020, pp. 7084-7096.
Liu et al., Deep anomaly detection for time-series data in industrial IoT: A communication-efficient on-device federated learning approach, IEEE Internet of Things Journal, vol. 8, No. 8, Apr. 15, 2021, pp. 6348-6358.
Pahl et al., All eyes on you: Distributed Multi-Dimensional IoT microservice anomaly detection, 14th International Conference on Network and Service Management (CNSM), IEEE, 2018, pp. 72-80.
Miettinen et al., IoT Sentinel Demo: Automated Device-Type Identification for Security Enforcement in IoT, IEEE 37th International Conference on Distributed Computing Systems (ICDCS), Jun. 5-8, 2017, pp. 2177-2184, https://ieeexplore.ieee.org/document/7980220.

* cited by examiner

FIG. 6

# MULTI-LAYERED POLICY MANAGEMENT

CROSS-REFERENCE TO RELATED APPLICATIONS

The present application is a continuation of U.S. patent application Ser. No. 16/731,678 filed Dec. 31, 2019 and entitled "Multi-Layered Policy Management," which claims priority to U.S. Provisional Patent Application Ser. No. 62/787,190 filed Dec. 31, 2018 and entitled "Multi-Layered Policy Management," each of which is hereby incorporated by reference herein.

DETAILED DESCRIPTION

Figure 1:
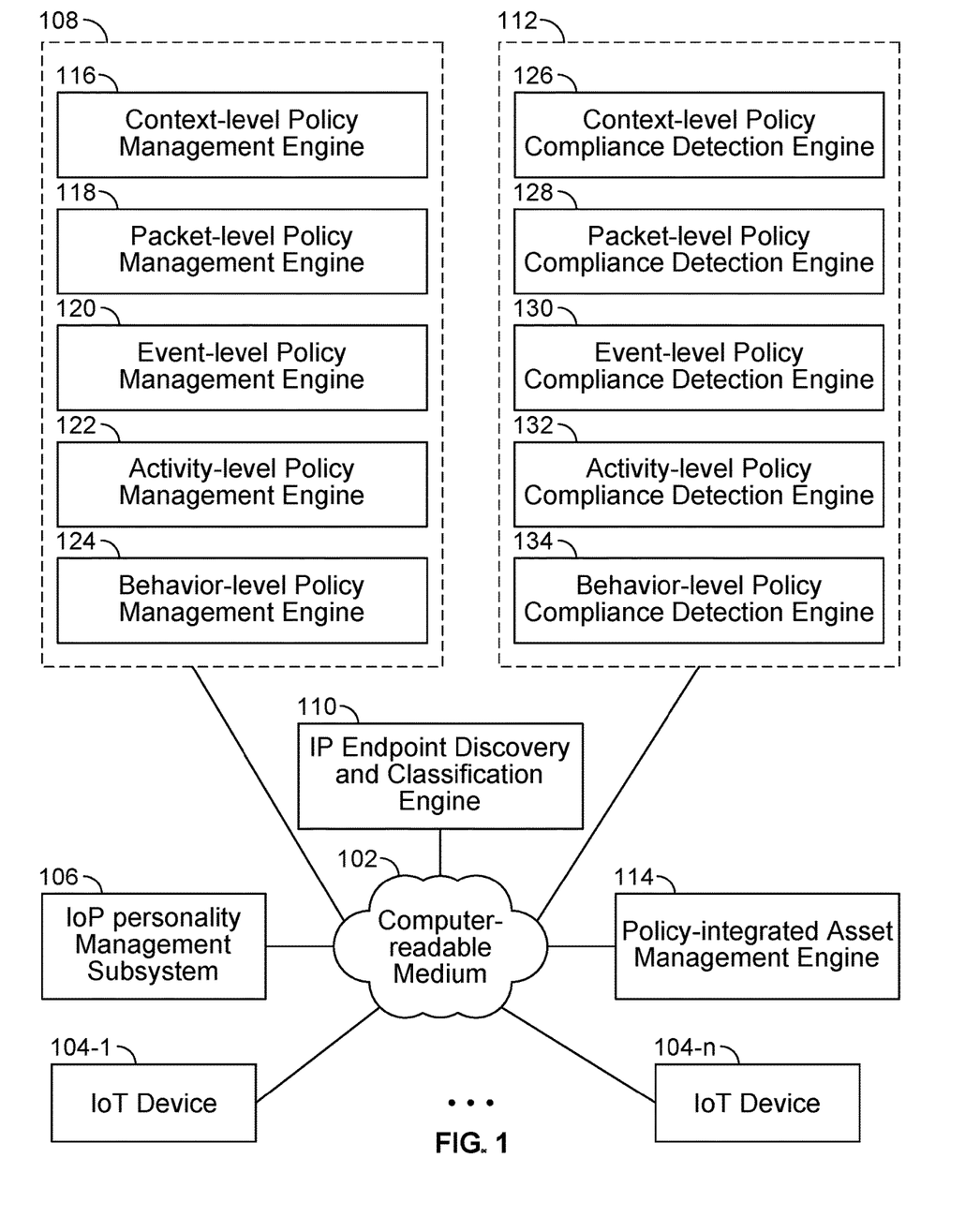
FIG. 1 depicts a diagram of an example of an enterprise network management system with multi-layered policy management and multi-layered policy matching subsystems.

FIG. 1 depicts a diagram 100 of an example of an enterprise network management system with a multi-layered policy management and multi-layered policy matching subsystems. The diagram 100 includes a computer-readable medium 102, Internet of Things (IoT) device 104-1 . . . 104-n (hereinafter referred to as "IoT devices 104") coupled to the computer-readable medium 102, an IoT personality management subsystem 106 coupled to the computer-readable medium 102, a multi-layered policy management subsystem 108 coupled to the computer-readable medium 102, an Internet Protocol (IP) endpoint classification engine 110 coupled to the computer-readable medium 102, a multi-layered policy compliance detection subsystem 112 coupled to the computer-readable medium 102, and a policy-integrated asset management engine 114 coupled to the computer-readable medium 102. The multi-layered policy management subsystem 108 includes a context-level policy management engine 116, a packet-level policy management engine 118, an event-level policy management engine 120, an activity-level policy management engine 122, and a behavior-level policy management engine 124. The multi-layered policy compliance detection subsystem 112 includes a context-level policy matching engine 126, a packet-level policy matching engine 128, an event-level policy matching engine 130, an activity-level policy matching engine 132, and a behavior-level policy matching engine 134.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent devices with wired or wireless interfaces through which the IoT devices 104 can send and receive data over wired or wireless connections. Examples of IoT devices include thermostats, mobile devices, biological managers, sensory devices, and functionality performing devices. The IoT devices 104 can include unique identifiers which can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 104 are purposefully built or configured IoT devices. In being purposely built IoT devices, the IoT devices 104 are built to have specific operational parameters. For example, a thermometer may be built to provide signals from a temperature sensor. In being purposely configured IoT devices, the IoT devices 104 can be configured to operate according to specific operational parameters in accordance with input from a human or artificial agent. For example, an IoT device of the IoT devices 104 can be a thermostat configured to control an air conditioner to cool a room to a configurable temperature at a configurable time. As another example, an agent can specify an IoT device should not communicate with a specific data source, and the IoT device can be configured to refrain from communicating with the specific data source as part of purposeful configuration.

In the example of FIG. 1, the IoT personality management subsystem 106, which includes an IoT personality management engine 106, is intended to represent a subsystem that manages personalities of the IoT devices 104 within the context of an IoT network. In a specific implementation, at least a portion of the IoT personality management subsystem 106 is implemented remote relative to IoT devices for which the system manages policy. The multi-layered policy management subsystem 108, the IP endpoint classification engine 110, the multi-layered policy compliance detection subsystem 112, and/or the policy-integrated asset management engine 114 can utilize information provided by the IoT personality management subsystem 106 to fulfil their purpose(s).

Figure 2:
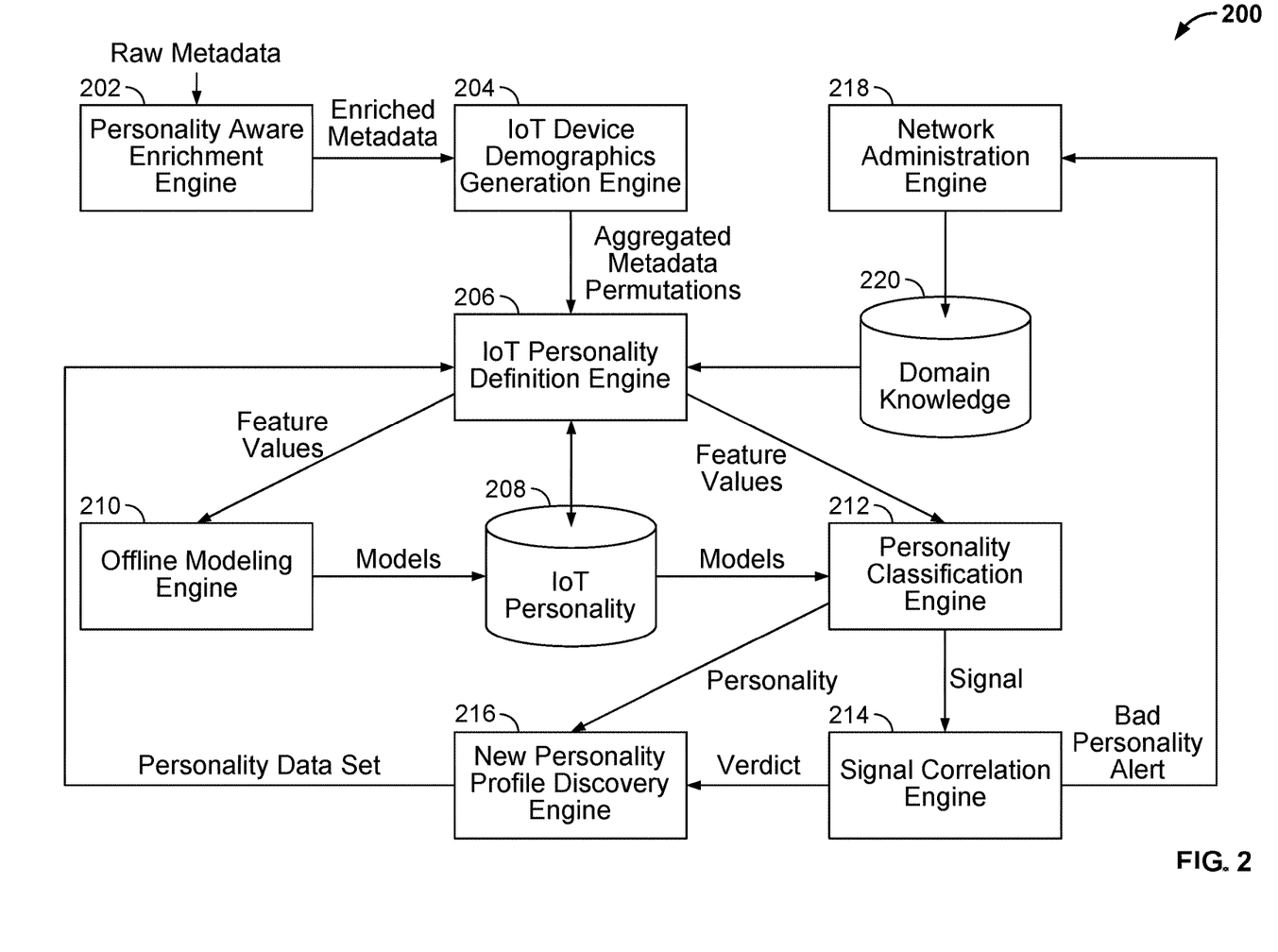
FIG. 2 depicts a diagram of an example of an IoT device personality management system.

FIG. 2 depicts a diagram 200 of an example of an IoT device personality management subsystem. IoT devices can be characterized as having a personality. A personality can be bad, which means the personality is identifiable as one that belongs to a device that exhibits or has an unacceptable risk to exhibit undesirable behavior. A personality can be good, which means the personality is identifiable as one that belongs to a device that has not and is not expected to exhibit undesirable behavior. Devices can exhibit anomalous behavior, but anomaly detection is a useful tool to determine whether a device is exhibiting undesirable behavior, so anomalous behavior is sometimes associated with undesirable behavior. Over time, anomalous behavior can be indicative of an as-of-yet-unidentified personality. That is, if a device with a first personality exhibits anomalous behavior, it may be possible to define a second personality similar in some ways to the first personality, but for which certain behavior is not anomalous. Similarly, a first personality could be better defined over time to include what was previously anomalous behavior as non-anomalous behavior. Accordingly, it may be desirable to provide a system that can not only classify IoT devices as having various personalities, but also to provide a system that can allow personality to have malleable definitions and that can define new personalities over time.

The example system shown in FIG. 2 can be included as part of an applicable system for multi-level policy management and compliance detection, and asset management. Applicable portions of the system shown in FIG. 2 can be implemented locally with respect to an IoT device, e.g. at a device within a LAN of the IoT device. Additionally, applicable portions of the system shown in FIG. 2 can be implemented remote from an IoT device, e.g. in a cloud.

The example system shown in FIG. 2 includes a personality aware enrichment engine 202, an IoT device demographics generation engine 204, an IoT personality definition engine 206, an IoT personality datastore 208, an offline modeling engine 210, a personality classification engine 212, a signal correlation engine 214, and a new personality profile discovery engine 216, a network administration engine 218, and a domain knowledge datastore 220. In the context of FIG. 2, personality awareness is more specific than context awareness in the sense that personality implicates an understanding of institutional protocols. An IoT device that "has a personality" indicates the IoT device most closely matches a known personality and at least one of the combination of features that define the personality is associated with an institutional protocol. It should be noted that, for practical purposes, it may be desirable to throw away irrelevant or unstable features to match an IoT device to a personality.

The personality aware enrichment engine 202 is intended to represent an engine that functions to enrich raw event metadata received based on operation of an IoT device. The personality aware enrichment engine 202 can receive raw metadata in the form of data packets or portions of data packets transmitted to and from an IoT device in operation of the IoT device. In enriching raw event metadata, the personality aware enrichment engine 202 can identify an IoT device and assign a context to the IoT device.

The IoT device demographics generation engine 204 is intended to represent an engine that receives enriched metadata to maintain demographics of IoT devices including the IoT device. The IoT device demographics generation engine 204 receives the enriched metadata from the personality aware enrichment engine 202. In maintaining demographics of IoT devices based on enriched metadata, the IoT device demographics generation engine 204 can establish profiles of groups of IoT devices. For example, the IoT device demographics generation engine 204 can group together IoT devices that share a common context together to form a profile of a group of the IoT devices. Additionally, in maintaining demographics of IoT devices, the IoT device demographics generation engine 204 can aggregate and create permutations of the enriched metadata to generate aggregated metadata permutations. For example, the IoT device demographics generation engine 204 can group together all enriched metadata related to streaming events at the IoT device together to generate aggregated metadata permutations.

The IoT personality definition engine 206 is intended to represent an engine that functions to define a personality of the IoT device. The IoT personality definition engine 206 can define a personality of the IoT device by generating and updating IoT personality data stored in the IoT personality datastore 208. Additionally, the IoT personality definition engine 206 can define a personality of the IoT device using aggregated metadata permutations received from the IoT device demographics generation engine 204. More specifically, the IoT personality definition engine 206 can identify feature values indicating behaviors of the IoT device in operation based on aggregated metadata permutations received from the IoT device demographics generation engine 204.

The offline modeling engine 210 is intended to represent an engine that functions to build a context-based undesired behavior detection model for use in detecting undesired behavior in the operation of the IoT device. The offline modeling engine 210 can build a context-based undesired behavior detection model based on feature values indicating behaviors of the IoT device in operation, as determined by the IoT personality definition engine 206. Additionally, the offline modeling engine 210 can use an applicable machine learning mechanism to recognize behavior patterns in the feature values to build the context-based undesired behavior detection model. For example, the offline modeling engine 210 can use either or both learned state transition-based learning and deep learning to identify behavior patterns of the IoT in operation for purposes of maintaining a context-based undesired behavior detection model.

The personality aware undesired behavior detection engine 212 is intended to represent an engine that functions to apply a context-based undesired behavior detection model to feature values for purposes of detecting undesired behavior in the operation of the IoT device. The personality aware undesired behavior detection engine 212 can apply a context-based undesired behavior detection model maintained by the offline modeling engine 210 to feature values of the IoT device identified by the IoT personality definition engine 206. In applying the model to feature values, the personality aware undesired behavior detection engine 212 generate a signal comparing actual behaviors of the IoT device in operation to modeled behaviors of the IoT device.

The signal correlation engine 214 is intended to represent an engine that functions to generate and send undesirable behavior alerts. The signal correlation engine 214 can generate and send undesirable behavior alerts based on actual behaviors of the IoT device in operation to modeled behaviors of the IoT device, as received from the personality aware undesired behavior detection engine 212. The signal correlation engine 214 can send an undesirable behavior alert indicating how the IoT device deviated from normal behavior patterns, e.g. benign behavior patterns, in exhibiting undesired behavior in operation.

The new personality profile discovery engine 216 is intended to represent an engine that functions to identify a personality profile of the IoT device. The new personality profile discovery engine 216 can detect whether an IoT personality profile exists for the IoT device based on one or a combination of raw metadata received at the personality aware enrichment engine 202, enriched raw metadata received at the IoT device demographics generation engine 204, aggregated metadata permutation received at the IoT personality definition engine 206, and feature values determined by the IoT personality definition engine 206. The new personality profile discovery engine 216 can inform the IoT personality definition engine 206 whether an IoT personality profile exists for the IoT device for purposes of defining the IoT personality for the IoT device.

Figure 3:
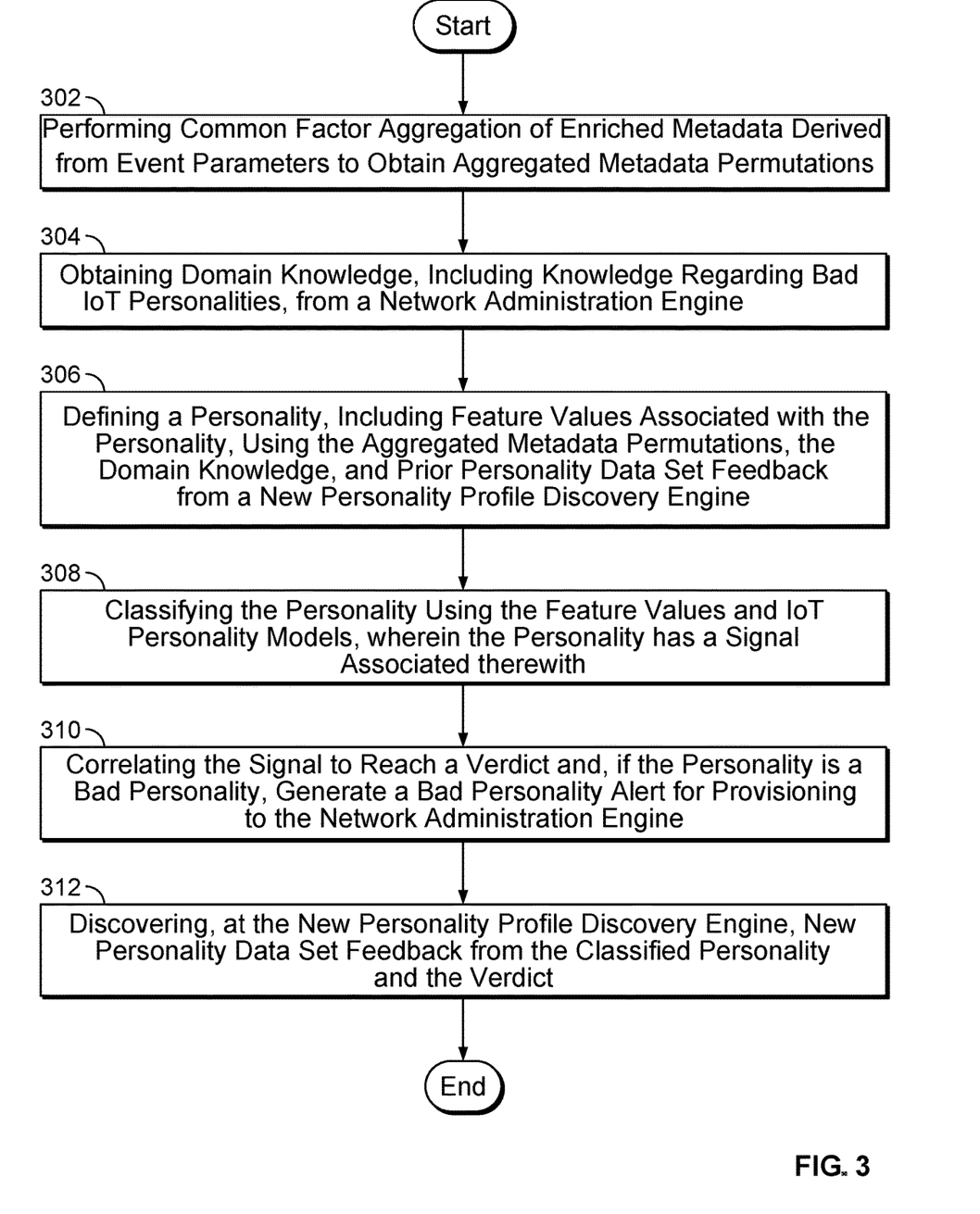
FIG. 3 depicts a flowchart of an example of a method of IoT device personality management.

FIG. 3 depicts a flowchart 300 of an example of a method of IT device personality management. The flowchart 300 starts at module 302 with performing common factor aggregation of enriched metadata derived from event parameters to obtain aggregated metadata permutations. An example of an engine that can perform module 302 is the IoT device demographics generation engine 204 of FIG. 2.

The flowchart 300 continues to module 304 with obtaining domain knowledge, including knowledge regarding bad IoT personalities, from a network administration engine. An example of an engine that can perform module 304 is the IoT personality definition engine 204 of FIG. 2, which obtains domain knowledge from the domain knowledge datastore 220.

The flowchart 300 continues to module 306 with defining a personality, including feature values associated with the personality, using the aggregated metadata permutations, the domain knowledge, and prior personality data set feedback from a new personality profile discovery engine. An example of an engine that can perform module 306 is the IoT personality definition engine 206 of FIG. 2.

The flowchart 300 continues to module 308 with classifying the personality using the feature values and IoT personality models, wherein the personality has a signal associated therewith. An example of an engine that can perform module 308 is the personality classification engine 212 of FIG. 2.

The flowchart 300 continues to module 310 with correlating the signal to reach a verdict and, if the personality is a bad personality, generate a bad personality alert for provisioning to the network administration engine. An example of an engine that can perform module 310 is the signal correlation engine 214 of FIG. 2.

The flowchart 300 continues to module 312 with discovering, at the new personality profile discovery engine, new personality data set feedback from the classified personality and the verdict. An example of an engine that can perform module 312 is the new personality profile discovery engine 216 of FIG. 2.

Referring once again to the example of FIG. 1, the multi-layered policy management subsystem 108, which includes a multi-layered policy management engine, is intended to represent a system that understands domain-specific context and uses machine learning to generate additional domain knowledge. In a specific implementation, at least a portion of the multi-layered policy management subsystem 108 is implemented remote relative to IoT devices for which the system manages policy. For example, at least a portion of the multi-layered policy management subsystem 108 can be implemented as a cloud based system. Portions of the multi-layered policy management subsystem 108 implemented remote relative to IoT devices can receive data associated with the IoT devices through virtual private network (hereinafter "VPN") tunnels. For example, the multi-layered policy management subsystem 108 can receive outbound network traffic sent from IoT devices over a VPN tunnel. Additionally, VPN tunnels through which the multi-layered policy management subsystem 108 can send and receive data can be maintained using dedicated networking equipment. For example, the multi-layered policy management subsystem 108 can receive data associated with the IoT devices 104 using dedicated routers for communicating with the IoT devices 104.

Instead or in addition, at least a portion of the multi-layered policy management subsystem 108 can be implemented through a mirror in a gateway, one or more local agents, or on one or more IoT devices; intelligence can be distributed. A local agent includes software implemented on a physical device locally coupled to IoT devices. Local coupling involves operationally connecting the local agent via a LAN interface (or a smaller network interface, such as a PAN interface) to IoT devices. It should be noted enterprise networks can include geographically distributed LANs coupled across WAN segments. In a distributed enterprise network, the local agents may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here). Depending upon implementation-specific or other considerations, the multi-layered policy management subsystem 108 can include wired communication interfaces and wireless communication interfaces for communicating over wired or wireless communication channels. The multi-layered policy management subsystem 108 can be, at least in part, a device provided by an Internet service provider directly purchased by a consumer and acting as a conduit between networks. Depending upon implementation or other considerations, the multi-layered policy management subsystem 108 can be implemented as part of a private cloud. A private cloud implementing the multi-layered policy management subsystem 108, at least in part, can be specific to an entity.

Policy is defined by institutional or security system agents at one of multiple levels of abstraction. The context-level policy management engine 116 is intended to represent an engine that enables a human or artificial agent to create, read, update, or delete (CRUD) policy at a context-level of abstraction (via context-level parameters). A context of an IoT device, as used herein, includes IoT device profiles, IoT device categories, applicable operational parameters of an IoT device in operation, to name a few. For example, an IoT can be profiled as a thermostat, categorized as a General Electric product, and context can include an ID of an IoT device, sources (or paths) of messages to the IoT device, destinations (or paths) of messages from the IoT device, current operational parameters of the IoT device, e.g. how an IoT device operates in controlling itself, behaviors of an IoT device in operation, whether an IoT device is actually operating, data ports used by an IoT device in sending and receiving data, types of data sent or received, operating systems used by an IoT device, and applications used by an IoT device. Further, a context of an IoT device can include applicable operational parameters of an IoT device in operation to either or both access network services and broadcast. For example, a context of an IoT device can include a message an IoT device broadcasts in acting as a beacon. In another example, a context of an IoT device can include a data source with which an IoT device communicates through a WAN.

Context-level policy management parameters are granular. Accordingly, creating and managing policy at the context level may, in some cases, require some network administrative expertise. Contexts can include background event contexts, identity-based contexts, and group-based contexts. Identity-based and group-based contexts can be characterized as dynamically-established context because they take into account baseline (predicted) behavior. The type of device (or group) can be considered part of group-based context, allowing application of policy to devices in the group. For example, IV pumps do not talk to VLANs, so one predefined context-level protocol can be used for IV pumps.

Context parameters can include, for example, specific threat vectors, IoT device information (e.g., MAC address, operating system, operating system version, model), VLAN information, or the like. Advantageously, identity-based, behavioral, risk/threat models, and other parameters that are derived from IoT personality creation and management are available at the context level.

In a specific implementation, the context-level policy management engine 116 makes decisions regarding policy, instead of a human, based on context. Otherwise, the human would have had to take care of all conditions. For example, a user would have to make a policy for a specific IV pump, but the context-level policy management engine 116 can apply policy to all IV pumps (or prompt the human to do the same); henceforth, when a human says "IV pump," the context-level policy management engine 116 knows the human is referring to IV pumps matching the policy. Advantageously, keywords allow a human to teach the context-level policy management engine 116 about policy preferences simply by using them and the context-level policy management engine 116 can recommend policy matching value thresholds for use in policy creation.

Policy can be based upon patterns in packets that match regular expressions of policy rules. The packet-level policy management engine 118 is intended to represent an engine that enables a human or artificial agent to create, read, update, or delete (CRUD) policy at a packet-level of abstraction (via packet-level parameters). A network intrusion detection system (IDS) and intrusion prevention system (IPS) known as snort is recognized as an excellent piece of open source software that utilizes regular expressions. Snort rules, however, are sufficiently granular that they regularly produce false positives. For an IoT network in particular, the number of false positives can reach nuisance levels. Advantageously, the packet-level policy management engine 118 can use snort rules as a backup (e.g., to be certain), without relying on snort rules as a matter of course. The system instead encourages rules to be made at as high a level as possible. Specifically, it is easier to build in hooks at higher levels of abstraction than it is using regular expression matching at the packet-(or context-) level.

Recognizing that "normal" matches may be associated with malicious activity in the aggregate, machine learning is used to determine whether "normal" packets are part of a malicious sequence. Because the multi-layered policy management system 108 includes multiple levels (including at least one of a higher level of abstraction than the packet-level), policy need not be based solely upon regular expression matching at the packet-level. Patterns can be converted to fields of an event, which is a higher level of abstraction, for example. As used in this paper, the packet- and context-levels of abstraction are defined as "low levels of abstraction" and the event- and higher levels of abstraction are defined as "high levels of abstraction." In a specific implementation, human agents are permitted to create policy at high levels of abstraction, but not at low levels of abstraction.

The event-level policy management engine 120 is intended to represent an engine that enables a human or artificial agent to create, read, update, or delete (CRUD) policy at an event-level of abstraction (via event-level parameters). In an example of operation, events are assumed to be network session events. A transformation, enrichment, and aggregation of data from low levels of abstraction to high levels of abstraction hides granular details, resulting in a layered policy engine that enables agents to engage with the system at a level of abstraction with which they are comfortable. (Transformation, enrichment, and aggregation are also done between event- and activity-levels and between activity- and behavior-levels.)

Figure 4:
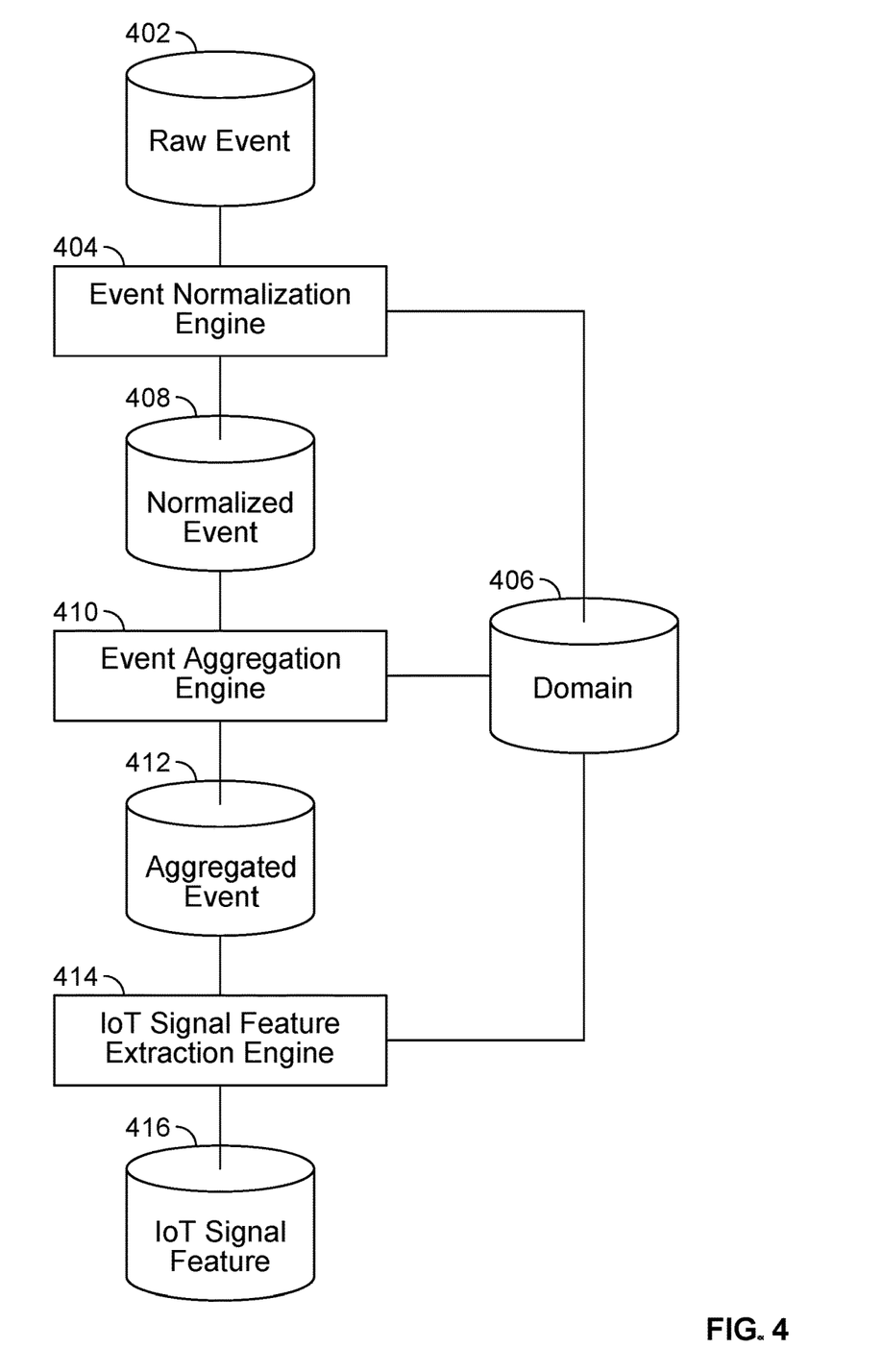
FIG. 4 depicts a diagram of an example of a multi-layered policy management system.

FIG. 4 depicts a diagram 400 of an example of an IoT signal feature generation engine. The diagram 400 includes a raw event datastore 402, an event normalization engine 404 coupled to the raw event datastore 402, a domain datastore 406 coupled to the event normalization engine 404, a normalized event datastore 408 coupled to the event normalization engine 404, an event aggregation engine 410 coupled to the domain datastore 406 and the normalized event datastore 408, an aggregated event datastore 412 coupled to the event aggregation engine 410, an IoT signal feature extraction engine 414 coupled to the domain datastore 406 and the aggregated event datastore 412, and an IoT signal feature datastore 416 coupled to the IoT signal feature extraction engine 414. Some of the components illustrated in the diagram 400 can be implemented in whole or in part at a different physical location than other components.

The raw event datastore 402 is intended to represent events of various kinds. A significant subclass of events are network session events or "network events." In some implementations, network events can appropriately be referred to as "packet-based" (or "frame-based") events because network event capture is of packets or frames. In a specific implementation, a discrete network event is a network session. Alternatively or in addition, a discrete network event is a portion of a persistent network session that has been broken into chunks, wherein the chunks of a network session, in the aggregate, comprise a network session. Another potential subclass of events includes message transport events, such as messages using a lightweight publish/subscribe messaging transport (e.g., message queuing telemetry transport (MQTT)). Another potential subclass of events includes message log events, such as messages using a standard to separate message generators, systems that store messages, and message analysis and reporting engines (e.g., syslog). The raw event datastore 402 can be considered part of a "super" datastore that incorporates other datastores, such as the normalized event datastore 408, the aggregated event datastore 412, and the IoT signal feature datastore 416.

The event normalization engine 404 is intended to represent an engine that normalizes events of disparate formats. The event normalization engine 404 uses information from the domain datastore 406 to determine a normalized (e.g., standardized) format for events and normalizes (e.g., transforms) events from the raw event datastore 402 for storage into the normalized event datastore 408. In a specific implementation, events are normalized using one or more of a timestamp, tagging (e.g., from the domain datastore 406), an ID (e.g., a user ID or event ID), or the like. Normalizing events enables later engines to perform an apples-to-apples comparison of events for, e.g., aggregation purposes. In an implementation in which, e.g., only network events are aggregated, normalization may or may not be considered optional.

The event aggregation engine 410 is intended to represent an engine for aggregating a normalized event from the normalized event datastore 408 with other related events. In a specific implementation, the other related events are also normalized events in the normalized event datastore 408. Related events can include, for example, multiple discrete network events of a persistent session; events associated with the same source, user, time, or application; events that (based on, e.g., domain knowledge) might be related to an activity (e.g., login, download, streaming, or other possible activity); events associated with an IoT device profile; events that are related on a time series level; or the like.

As used in this paper, an analytics feature is a transformation of one or more timestamped events, including composite events. As used in this paper, a composite event comprises multiple event parameters, but is referred to as an "event," which is a more general term intended to represent a discrete event or a combination of event parameters (which can include one or more discrete events). For example, a discrete event, such as a signal transmitted from a thermometer associated with a discrete temperature sensing instance, can be combined with an event parameters for the destination of the signal, historical signal transmissions, transmissions of similarly classified IoT devices, and the like, to generate a composite event. A machine learning analytics engine can determine analytics features of IoT devices in operation based on messages transmitted to or from IoT devices. For example, the machine learning analytics engine can examine messages transmitted to an IoT device to determine an event which can subsequently be timestamped to create an analytics feature of the IoT device in operation. The machine learning analytics engine can generate analytics features of IoT devices in operation within a time window. For example, the machine learning analytics engine can examine all messages transmitted from an IoT device within a one hour period to determine a feature of the IoT device in operation. A time window, also referred to as a data rollup window, used by the machine learning analytics engine to generate features of an IoT device in operation. For example, the machine learning analytics engine can examine packets transmitted from a first IoT device over a 24 hour period and examine packets transmitted from a second IoT device over a five minute period to extract features of the first and second IoT devices in operation. A time window used by the machine learning analytics engine to extract features of IoT devices in operation can vary based on contexts of the IoT devices. For example, the machine learning analytics engine can vary time windows used to extract features of IoT devices in operation based on device types of the IoT devices.

Common factor aggregation creates various aggregations and transformations from the incoming data events leveraging on supervised classification, unsupervised clustering-based machine learning, and multi-layer deep learning to model various behavior patterns of IoT devices so the IoT devices can be grouped/labelled based on their behaviors. For example, an ultrasound machine running windows OS and connecting to its home servers in Europe would be tagged with, in this example, two different behavior aggregation factors and the correlation of these behaviors can help accurately identify the device as an ultrasound machine of a specific model. Events can be aggregated based on context, such as by way of a profile-based aggregation. For example, event can be aggregated based on recipients of data packets transmitted from an IoT device, an IoT device ID, or a port used transmit data packets from which the events are translated.

To allow comparison of events for common factor aggregation, a harmonized framework of events (e.g., a common methodological framework) is desirable, which can be implemented as a huge amount of data that is analyzed for commonalities. The analysis takes more or less work depending upon the type of data (e.g., comparing sources and destinations is relatively straight-forward, while comparing values identified using deep packet inspection of payload is relatively less straight-forward). Reducing factors to a common baseline is impractical due to the number of different aggregations that are relevant in an IoT network comprising a large number of devices; reduction to a common baseline is useless for predictive purposes. Multiple aggregations are necessary and may not even be easily identifiable to a human because the common factors are not easily categorized by the human mind and, due to their numbers, will, in practice, likely go without human-understandable aggregations of common factors. Indeed, it is a hopeless task for a human given the number and frequency of communications IoT networks are already generating, even if all of the aggregations were uniquely describable to a human. So a computer must be used to find the large number of common factors necessary to yield predictable, and therefore actionable, intelligence; humans can, of course, help in categorization or other tasks after being augmented by the computer.

The event aggregation engine 410 stores the aggregated events in the aggregated event datastore 412. Note that an "aggregated event" can include one or more normalized events and context will dictate whether that means one aggregated event includes one normalized event or one aggregated event includes multiple normalized events.

The IoT signal feature extraction engine 414 is intended to represent an engine for extracting features from signals associated with an IoT device. A feature value includes a data sample corresponding to the feature itself. The IoT signal feature extraction engine 414 stores the feature values in the IoT signal feature datastore 416.

In an example of operation, events are assumed to be network session events. The event normalization engine 404 (if applicable) normalizes a volume (e.g., a number of bytes) of events over a time span (e.g., a five minute interval). The event aggregation engine 410 aggregates the one or more events captured during the time span. It may be noted, an event that is not aggregated may still be analyzed by the IoT signal feature extraction engine 414, along with any aggregated events.

Referring once again to the example of FIG. 1, in a specific implementation, the event-level policy management engine 120 generates single-event policy (e.g., patient monitor is using a weak manufacturing password, the policy for which would be set by storing the common password and triggering an alert if it is later matched). In a specific implementation, the event-level policy management engine 120 generates an aggregated event policy (e.g., download for 20 X-ray machines from a risky site, the policy for which would be set by looking for downloads from a risky site by multiple IoT devices and triggering an alert if it is later matched). In a specific implementation, time-aggregated events are aggregated in at least 50 different ways to match conditions with the different aggregations. In a specific implementation, the event-level policy management engine 120 generates policy from feature analytics (e.g., excessive protocol usage to communicate with devices never seen before).

Figure 5:
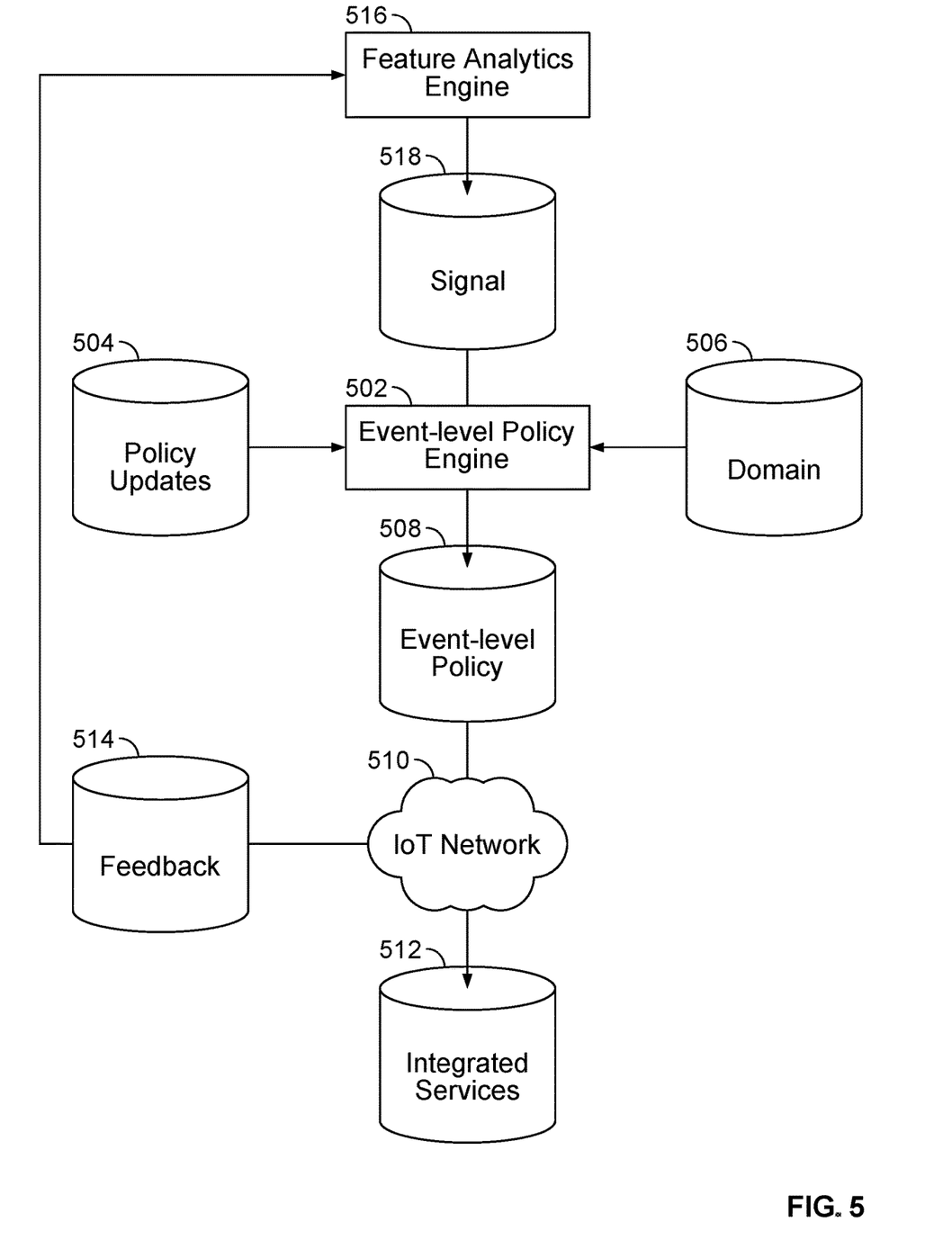
FIG. 5 depicts a diagram of an example of a system utilizing feature analytics for event-level policy generation.

FIG. 5 depicts a diagram 500 of an example of a system utilizing feature analytics for event-level policy generation. The diagram 500 includes an event-level policy engine 502, a policy updates datastore 504 coupled to the event-level policy engine 502, a domain datastore 506 coupled to the event-level policy engine 502, an event-level policy datastore 508 coupled to the event-level policy engine 502, an IoT network 510 coupled to the event-level policy datastore 508, an integrated services datastore 512 coupled to the IoT network 510, a feedback datastore 514 coupled to the IoT network 510, a feature analytics engine 516 coupled to the feedback datastore 514, and a signal datastore 518 coupled to the feature analytics engine 516.

The event-level policy engine 502 is intended to represent generating policy at a level of abstraction above the packet-level. The event-level policy engine 502 obtains policy updates from the policy updates datastore 504, which is intended to represent policy updates from human or artificial agents. It may be noted the policy updates can be for levels of abstraction above or below that of the event-level if they impact policy at the event-level. The event-level policy engine 502 also obtains IoT device, environment, and administrative context from the domain datastore 506. The event-level policy engine 502 generates event-level policy as represented by the event-level policy datastore 508.

In the example of FIG. 5, the IoT network 510 operates in accordance with the event-level policy of the event-level policy datastore 508. Actions can include output to integrated services, as represented by the integrated services datastore 512, and other actions (not shown). The feedback datastore 514 represents data captured in a data pipeline or other medium, which is fed back to the feature analytics engine 516. Advantageously, feedback from the IoT network can improve policy (e.g., addressing how to improve coverage). The feature analytics engine 516 provides a signal, represented by the signal datastore 518, for consumption by the event-level policy engine 502 to generate new policy based upon detected characteristics of the IoT network. Advantageously, policy can be generated using a single event, an aggregated event, or a feature analytics signal.

Advantageously, a conditional rule can be made for an event without matching packet data. The abstraction reduces complexity and the likelihood of error or misunderstanding. The abstraction also enables predictive policy. For example, if B (malicious) happens a small amount of time after A (benign), machine learning can be used to find a common-sense threshold.

Referring once again to the example of FIG. 1, the activity-level policy management engine 122 is intended to represent an engine that enables a human or artificial agent to create, read, update, or delete (CRUD) policy at an activity-level of abstraction (via activity-level parameters). For example, rules can match a disk backup activity or a file system backup activity. As used in this paper, an activity includes one or more events and data associated with those events (e.g., sequence, timing, etc.). Thus, FIG. 5 can be modified (replacing event-level with activity-level in components 502, 508) for operations at activity level by simply operating at a higher level of abstraction. Starting at the activity level, an agent can provide a policy update of "if you see an anomaly X, take action Y." An activity-level policy engine can provide advice, such as when to create software update policy, generate alerts when devices are operational, generate alerts when operation drops below a certain level, and provide useful information about, e.g., IV pump utilization (e.g., time offline, time online, time operational, time in use). Thus, activity-level policy management is particularly useful for asset management, which is discussed later in more detail.

The behavior-level policy management engine 124 is intended to represent an engine that enables a human or artificial agent to create, read, update, or delete (CRUD) policy at a behavior-level of abstraction (via behavior-level parameters). As used in this paper, a behavior includes one or more activities and data associated with those activities (and an activity includes one or more events and data associated with those events). Thus, FIG. 5 can be modified (replacing event-level with behavior-level in components 502, 508) for operations at behavior level by simply operating at a higher level of abstraction. Particularly at the behavior level, an agent can state "I care about X" and the behavior-level policy engine can generate policy in response thereto. For example, if the agent cares about security, then policy can be to generate an alert when anything that might be a security risk is detected. Dynamic policy can be created such that where a policy did not exist, after getting "5 hits" in which an agent is interested, the behavior-level policy engine generates the policy. As used in this paper, dynamic policy is that which does not exist until an anomaly is detected, an imprint is converted into a policy, or the like, and policy is generated in response thereto. (It may be noted that conventional "static" policy is simply conditional policy that does exist prior to the triggering event.)

Figure 6:
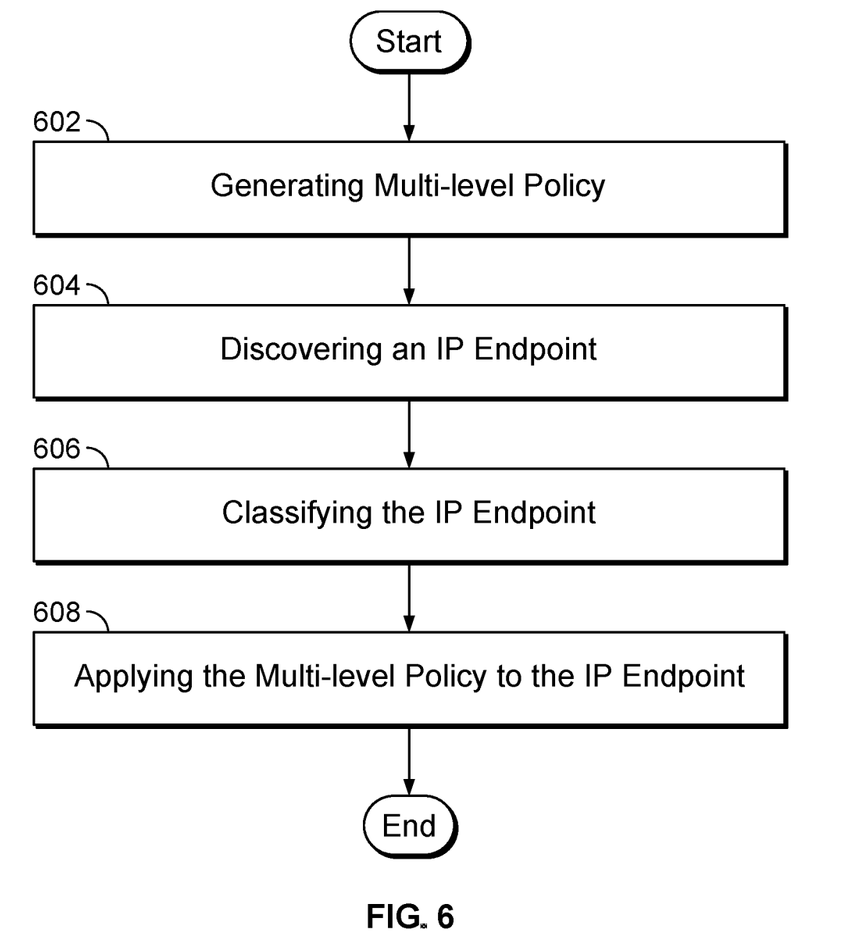
FIG. 6 depicts a flowchart of an example of a method of applying policy to IP endpoints.

The IP endpoint discovery and classification engine 110 is intended to represent an engine that discovers IP endpoints that do not match policy and uses machine-learning techniques to classify the discovered IP endpoints to make policy applicable. In a specific implementation, at least a portion of the IP endpoint discovery and classification engine 110 is implemented remote relative to IoT devices for which the system manages policy. Advantageously, policy can apply when a device is categorized or identified, even if the device has been there for awhile (whether the device is an IP endpoint or other IoT device). Although ghost matching is a known technique, it does not entail 1) policy is generated, 2) IP endpoints are discovered that do not match the policy, and 3) the IP endpoints are classified to make the policy applicable. FIG. 6 illustrates this principle.

FIG. 6 depicts a flowchart 600 of an example of a method of applying policy to IP endpoints. The flowchart 600 starts at module 602 with generating multi-level policy. Multi-level policy can be generated by a multi-level policy management engine, such as the multi-level policy management engine 108 (FIG. 1).

The flowchart 600 continues to module 604 with discovering an IP endpoint. An IP endpoint can be discovered by an IP endpoint discovery and classification engine, such as the IP endpoint discovery and classification engine 110 (FIG. 1).

The flowchart 600 continues to module 606 with classifying the IP endpoint. An IP endpoint can be classified by an IP endpoint discovery and classification engine, such as the IP endpoint discovery and classification engine 110 (FIG. 1).

The flowchart 600 ends at module 608 with applying the multi-level policy to the IP endpoint. Multi-level policy can be applied by a multi-level policy compliance detection engine, such as the multi-level policy compliance detection engine 112 (FIG. 1). Because the multi-level policy is generated prior to discovering the IP endpoint, the multi-level policy can be referred to in this context as pre-defined multi-level policy. Accordingly, when the IP endpoint violates policy, the pre-defined multi-level policy can be applied to the IP endpoint as soon as it is identified.

Referring once again to the example of FIG. 1, the multi-layered policy compliance detection subsystem 112 is intended to include engines that determine deviations from policy in IoT device operation. In a specific implementation, at least a portion of the multi-layered policy compliance detection subsystem 112 is implemented remote relative to IoT devices for which the system manages policy. In the diagram 100, the multi-level policy compliance detection subsystem 112 includes engines that correspond to the engines of the multi-level policy management engine 108. Thus, policy and deviations therefrom are each multi-level. Deviations from policy can be characterized as "undesirable behavior." It may be noted that an IoT device with a good personality can exhibit anomalous behavior and still be considered to have a good personality while an IoT device with a bad personality need not exhibit anomalous behavior and still be considered to have a bad personality. This is made of note because techniques used to identify undesirable behavior can include anomaly detection, but anomaly detection is not the universe of undesirable behavior detection. As used in this paper, a personality includes mathematically modelled behavior patterns, with institutional knowledge built into the personality model; a personality includes one or more behaviors. Examples of bad personality include behavior associated with bots, C&C centers (botnet), or servers taken over by malware, to name three, all of which can have recognizable behaviors.

In the example of FIG. 1, the policy-integrated asset management engine 114 is intended to represent an engine that incorporates policy-related information for various assets from the multi-layered policy management subsystem 108 or the multi-layered policy compliance detection subsystem 112 to facilitate asset management. In a specific implementation, the policy-integrated asset management engine 114 includes a human-readable interface (e.g., a graphical user interface (GUI)) to facilitate providing information to and/or receiving instructions from a human agent. Through the interface, the human agent can define policy at a high level of abstraction, define match conditions that are at a higher level than regular expression matches (e.g., op status, activities, security events, event sequences, software patching, or the like). For example, a human agent could indicate an MRI machine is "mission critical" and allow software patching to occur automatically. Because mission critical machines cannot go offline, the system can generate an alert that the software patching rule is suspended because the MRI machine is operational.

Advantageously, policy generation and compliance and asset management are integrated. Action can be taken through policy (and redirect to integrated service for further action) on a security orchestration platform, network access control system, and/or security incident event management (SIEM) platform. Based upon event-, activity-, and/or behavior-level changes, the policy-integrated asset management engine 114 can make suggestions, such as virus scans or IoT device inventory recommendations (e.g., by determining, based upon the number of IV pump usage trends, failure rate, and the like, how many IV pumps should be ordered), or respond to previous commands (e.g., I want to know when a new IV pump model is detected, which would be an identity-based trigger).

A language can be defined for multi-level IoT network conduct. The language should be general enough to allow humans to create rules without a great deal of network administrative expertise that is applicable to events, activities, and behaviors. In a specific implementation, the language utilizes a keyword file that serves to identify activity parameters (e.g., those associated with a Windows download, device operations, etc.). Although it is difficult to provide a precise (finite) number of activities, in a specific implementation, about 200 activities have been identified and used in a network environment with exceptional results. The activities can be grouped.

A scenario, as used in this paper, is defined as one or more specific sequences of activities one or more of which can be mapped to a behavior. Behavior-level scenarios include, for example, compromised device (e.g., security anomaly with low risk, security anomaly with high risk, device infected by malware, device infected by ransomware, device hijacked for mining, device hijacked for botnet), device efficiency, device malfunction, connection anomalies (e.g., forming too many connections), data breach (e.g., file download followed by login anomaly). Activity-level scenarios include IT-based scan (e.g., network scan, port scan, file operation, backup, login, API form, or the like), device operations (e.g., device operational, device idle, device goes offline, device in use, or the like), or an application-specific quality (e.g., send email, send email with attachments, send email with executable file, send email with non-executable file, send a file that is a picture, or the like). Event-level scenarios include message volume, weak password, or the like. Context-level scenarios include presence on a medical VLAN (instead of a regular VLAN), version, or the like.

In an example of operation, when presenting behavioral scenarios, the policy-integrated asset management engine 114 does not include behaviors that are activities (note: a behavior can include a single activity) or activities that are events (note: an activity can include a single (discrete or aggregated) event) in order to better abstract for the benefit of a human agent. For a behavioral class with behavioral scenario instances, a human agent can choose scenario 1, 2, . . . , n, or all.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A system comprising:
a multi-level policy management engine configured to generate a multi-level policy for a network environment, wherein the multi-level policy includes a first policy at a low level of abstraction and a second policy at a high level of abstraction, and wherein the second policy at the high level of abstraction references an action to take if a particular activity is attempted by a device included in the network environment;
an Internet Protocol (IP) endpoint discovery and classification engine configured to:
discover, in the network environment, an Internet of Things (IoT) device which does not match at least one of the first or second policies, and classify the IoT device to make at least one of the first or second policies applicable to the IoT device, including by identifying that the IoT device does not have at least one of the first or second policies as an applicable policy, determining that the IoT device has violated at least one of the first or second policies, and in response, make the at least one of the first or second policies that has been violated applicable to the IoT device; and
a multi-level policy compliance detection engine configured to apply a set of multi-level policies to the IoT device based on the classification of the IoT device.

2. The system of claim 1, wherein the multi-level policy compliance detection engine is further configured to detect a deviation, by the IoT device, from the applicable policy, and wherein the system further comprises a signal correlation engine configured to generate and send an alert to an administrator of the network environment.

3. The system of claim 1, wherein the first policy at the low level of abstraction is at least context-based, and includes one or more of background event context, identity-based context, and group-based context.

4. The system of claim 1, wherein the first policy at the low level of abstraction is at least packet-based, and is based at least in part on patterns in packets that match regular expressions of policy rules.

5. The system of claim 1, wherein the second policy at the high level of abstraction is at least event-based, and is based at least in part on converting patterns to fields of an event.

6. The system of claim 1, wherein the second policy at the high level of abstraction is one of at least activity-based or behavior based.

7. The system of claim 1, wherein an administrator of the network environment is permitted to modify the second policy at the high level of abstraction and the first policy at the low level of abstraction.

8. The system of claim 1, wherein the multi-level policy management engine is configured to permit an administrator of the network environment to modify the second policy at the high level of abstraction and prevent the administrator from modifying the first policy at the low level of abstraction.

9. The system of claim 1, wherein generating the multi-level policy is based at least in part on machine learning.

10. The system of claim 1, wherein classifying the IoT device is based at least in part on machine learning.

11. A method comprising:
generating a multi-level policy for a network environment, wherein the multi-level policy includes a first policy at a low level of abstraction and a second policy at a high level of abstraction, and wherein the second policy at the high level of abstraction references an action to take if a particular activity is attempted by a device included in the network environment;
discovering, in the network environment, an Internet of Things (IoT) device which does not match at least one of the first or second policies, and classifying the IoT device to make at least one of the first or second policies applicable to the IoT device, including by identifying that the IoT device does not have at least one of the first or second policies as an applicable policy, determining that the IoT device has violated at least one of the first or second policies, and in response, making the at least one of the first or second policies that has been violated applicable to the IoT device; and
applying the set of multi-level policies to the IoT device based on the classification of the IoT device.

12. The method of claim 11, further comprising detecting a deviation, by the IoT device, from the applicable policy, and in response generating and sending an alert to an administrator of the network environment.

13. The method of claim 11, wherein the first policy at the low level of abstraction is at least context-based, and includes one or more of background event context, identity-based context, and group-based context.

14. The method of claim 11, wherein the first policy at the low level of abstraction is at least packet-based, and is based at least in part on patterns in packets that match regular expressions of policy rules.

15. The method of claim 11, wherein the second policy at the high level of abstraction is at least event-based, and is based at least in part on converting patterns to fields of an event.

16. The method of claim 11, wherein the second policy at the high level of abstraction is one of at least activity-based or behavior-based.

17. The method of claim 11, wherein an administrator of the network environment is permitted to modify the second policy at the high level of abstraction and the first policy at the low level of abstraction.

18. The method of claim 11, wherein an administrator of the network environment is permitted to modify the second policy at the high level of abstraction and is not permitted to modify the first policy at the low level of abstraction.

19. The method of claim 11, wherein generating the multi-level policy is based at least in part on machine learning.

20. The method of claim 11, wherein classifying the IoT device is based at least in part on machine learning.

* * * * *